United States Patent Office 3,812,202
Patented May 21, 1974

3,812,202
REACTION PRODUCT OF ACRYLAMIDE POLYMERS AND POLYPHENOLIC PRECURSOR
Howard J. Wright, Kansas City, Mo., assignor to Cook Paint and Varnish Company, Kansas City, Mo.
No Drawing. Filed Oct. 8, 1971, Ser. No. 187,878
Int. Cl. C08g 45/10, 37/16
U.S. Cl. 260—834
11 Claims

ABSTRACT OF THE DISCLOSURE

A resinous coating composition comprising the reaction product of (A) a polyphenolic precursor containing at least two phenolic hydroxyl groups obtained by reacting a phenol having at least two phenolic hydroxyl groups with a polyepoxide compound and (B) an acrylic copolymer of methylol acrylamide or methylol diacetone acrylamide with another ethylenically unsaturated monomer.

---

This invention relates to novel resinous coating compositions useful, for example, as coatings for metallic surfaces and as appliance finishes and to methods for their preparation.

More particularly, the invention relates to acrylamide coating compositions comprising the reaction product of (1) a polyphenolic precursor containing two or more phenolic groups which is advantageously but not necessarily obtained by reacting a phenol having at least two phenolic hydroxyl groups with a polyepoxide compound and (2) an acrylic copolymer which contains a methylol acrylamide monomer component, e.g. methylol acrylamide itself or methylol diacetone acrylamide together with another ethylenically unsaturated monomer.

The acrylamide compositions of the invention can be cured or cross-linked by heating to yield durable surface coatings which display excellent chemical resistance. A particular advantage of these acrylamide containing systems is that the phenolic functionality of the precursor can be separated by either an epon chain, an acrylic chain, or long aliphatic chains as in epoxidized oils and the methylol or methylol ether function of the acrylic polymers can be separated by the spacing in the acrylic backbone of the chain. The separation of these functions provides the desired control of the cross-linking density of the resinous compositions to give a range of properties from very hard to very flexible, depending upon the choice of the polyepoxide compound which is reacted with the phenol to produce the phenolic precursor (1) and the selection of the monomers utilized in preparing the methylol containing acrylic polymers (2) which in turn are reacted with the phenolic precursor to yield the compositions of the invention.

Phenols which can be used to react with the polyepoxides to provide component (1) of the present reaction products include any phenol having at least two phenolic hydroxyl groups, Bisphenol A or 2,2-bis(4-hydroxyphenyl)propane being particularly preferred. Other phenolic compounds that can be used include mononuclear phenols like resorcinol, catechol, hydroquinone, saligenin, phloroglucinal, etc. or polynuclear phenols like 4,4'-dihydroxybenzophenone, bis-(4-hydroxyphenyl)-1,1-ethane, bis-(4-hydroxyphenyl)-1,1-isobutane, bis(4-hydroxyphenyl)-2,2-butane, bis-(2-dihydroxynaphthyl)-methane, bis-(4 - hydroxy-2-methylphenyl) - 2,2 - propane, bis(hydroxy-2-tertiary butyl phenyl)-2,2-propane, 4,4'-dihydroxy biphenyl, 1,5-dihydroxy naphthalene, etc. The phenol can also be a monolac resin or a similar polyphenol resin.

Polyepoxide compounds which may be employed for the present purpose include: (a) acrylics containing oxirane rings such as 2,3-epoxypropyl acrylate, glycidyl methacrylate and the like. The acrylic resins of this type are obtained by reacting acrylic or methylacrylic acid with epichlorohydrin to produce a molecule containing an epoxy group and ethylene unsaturation. Typical is glycidyl methacrylate which may be polymerized through unsaturation to produce polyepoxy resins. Complex resins may be produced by copolymerizing with monomers of styrene, acrylonitriles, etc. The epoxy containing acrylic resins usually have numerous epoxide groups, e.g. approximately 5 to 10 per molecule, with molecular weights from 5000 to 10,000 or more; (b) epoxidized oils, which may be described as epoxy fatty acid esters in which the higher fatty acid group contains an epoxy group. They are ordinarily obtained by the reaction of peracetic acid with an ester of a higher fatty acid, the fatty acid group containing about 8 to 22 carbon atoms. Such materials would include epoxidized lanolin, castor oil, soybean oil, etc.; (c) ethoxyline resins, which are polyglycidyl ethers of polyhydric compounds and are conventionally prepared by reacting a polyhydric phenol, particularly bisphenol-A, with epichlorohydrin in alkaline solution. Regulation of the proportions of these two reactants controls the molecular size and molecular structure of the ethoxyline resins produced. A representative epoxy resin structure within category (c) may be illustrated as follows:

$$CH_2\overset{O}{\diagdown}CH-CH_2(O-R-O-CH_2-CHOH-CH_2)_n-$$

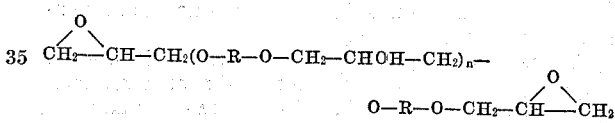

wherein $n$ is an integer of a magnitude dependent upon the degree to which the etherification is carried and is usually from 1 to 20 and R represents the divalent hydrocarbon radical of the dihydric phenol. One commercially available resin suitable for use in the process of the invention is "Epon 828" produced by the Shell Chemical Corporation and having the above structure (See Shell Chemical Corporation Bulletin SC:52–31 "Epon Resins for Surface Coatings" published 1952). Examples of other ethoxyline resins which may be employed in the practice of the present invention are disclosed in U.S. Pats. 2,494,295; 2,500,600 and 2,511,913; (d) epoxidized polybutadienes and the other epoxidized polyolefins normally produced by the peracetic acid process. Epoxidized polyolefins contain epoxy rings along the chain as well as at the end of the chain and passes lower densities than bisphenol epoxy resins and have good high temperature performance; (e) other materials containing two or more epoxy groups, for example, epoxidized novolac resins, 1,2-epoxy containing polyethers of polyhydric alcohols, such as polyglycidyl ethers thereof, like the diglycidyl ether of ethylene glycol, propylene glycol, trimethylene glycol, diethylene glycol, triethylene glycol, glycerol, dipropylene glycol and the like. Other typical ethers of this class include glycidyl ethers of polyhydric alcohols, such as the polyglycidyl ethers of glycol, diglycerol, pentaerythritol, pentaglycerol, mannitol, sorbitol, polyallyl alcohol, polyvinyl alcohol, and the like.

The reaction of the phenol having at least two phenolic hydroxy groups with the polyepoxide compound to produce the polyphenolic precursor (1) may be illustrated as follows using bisphenol A or resorcinol as the phenolic component:

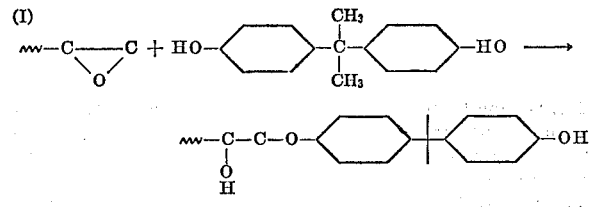

Polyepoxide + bisphenol A ⟶ polyphenolic precursor (1)

or

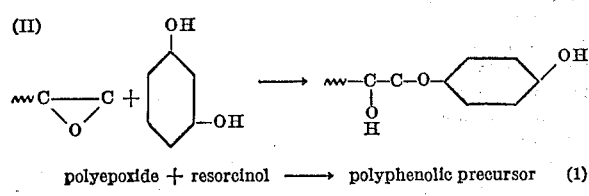

polyepoxide + resorcinol ⟶ polyphenolic precursor (1)

It is to be noted that the final phenol precursor (1) is not an epoxy compound, i.e. it is free from epoxy groups and is characterized by containing two or more phenolic groups. The epoxy starting material represents only a convenient way for preparing the polyphenolic precursor.

The phenolic precursor may be produced by heating the polyepoxide and phenol usually in the presence of a catalyst at temperatures of the order of about 140° C. to about 200° C. until the indicated reaction is completed. Proportions of the reactants can be varied over a relatively wide range but are usually one or less mole equivalents epoxide per mole of phenol. Advantageously the reaction is carried out in the pesence of an inert solvent or diluent e.g. aromatic or aliphatic hydrocarbon, such as xylene, toluene, naphthalene, hexane and the like. The choice of catalyst will depend on the nature of the phenolic and epoxy components but as illustrations there may be mentioned alkylamines, quaternary ammonium compounds and the like.

The methylol acrylic polymer component (2) may be prepared by the addition polymerization of a methylol acrylamide with one or more ethylenically unsaturated monomers including acrylic or methacrylic acids and their alkyl esters, particularly methyl acrylate, ethyl acrylate, butyl acrylate, hexyl acrylate, octyl acrylate, and the correspondingly methacrylate; nitriles of acrylic and methacrylic acids; vinyl halides; styrene and vinyl toluene; maleic acid and esters thereof; vinyl ethers; vinyl acetate and the like. Copolymers with widely varying properties may be obtained using mixtures of the above monomers. This makes it possible by proper selection of the monomers and proportions to prepare polymers having specific hardness and flexibility characteristics which are tailored for present purposes.

Component (2) may also be obtained by polymerizing acrylamide or diacetone acrylamide with one or more other ethylenically unsaturated monomers and then adding an aldehyde, such as formaldehyde, and possibly a catalyst to the polymerization mixture. The formaldehyde used for methylolation may be used in the form of a solution in butanol. For convenience a commercially available product known as Butyl Formcel and comprising a butanol solution containing 40% by weight of formaldehyde. When operating according to this aspect of the invention, etherification will take place so that at least some of the methylol groups will be converted to butylated polymers. Typical catalysts for use in preparing the acrylamide polymer component (2) herein include the organic peroxygen compounds or free radical polymerization initiators such as cumene hydroperoxide, tertiarybutyl perbenzoate, peracetic acid, benzoyl peroxide, ditertiary butyl peroxide, tertiary butyl hydroperoxide, etc.

The copolymerization reaction is preferably conducted in solution. Any inert organic solvent, e.g. ketones such as lower alkyl ketones of which methyl isobutyl ketone is illustrative, and lower alkanols such as methanol, ethanol and butanol may be used as the polymerization solvent with butanol preferred.

The copolymer containing methylol (and possibly butylated) groups, reacts with the phenolic precursor according to the invention as follows to give a cross-linked or cross-linking system:

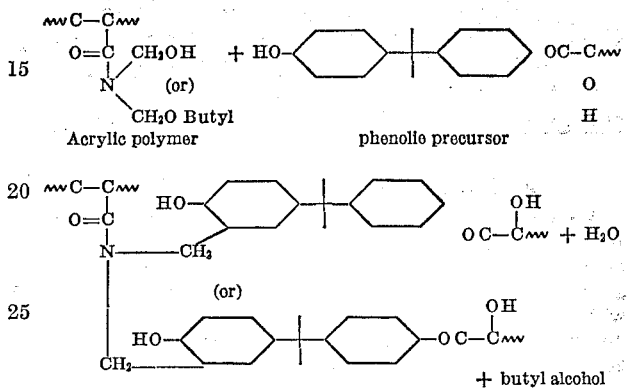

+ butyl alcohol

The proportions of polyphenolic precursor and acrylamide copolymer may be widely varied to give cross-linked products of different characteristics depending upon the desired use. As an example, and using percentages on a solids weight basis, 10% to 45% of polyphenolic precursor, which is the reaction product of Epon 828 and bisphenol A, may be reacted with 55% to 90% methylol acrylamide or methylol diacetone acrylamide copolymer to give highly useful products. Similarly, 5% to 45% of a polyphenolic precursor based on the product of an epoxidized oil and phenol having at least two phenolic groups may be usefully reacted with 65% to 95% methylol diacetone acrylamide or methylol acrylamide copolymer; and 10% to 55% of a reaction product of an oxirane ring containing acrylic copolymer and phenol with at least two phenolic groups can be very usefully reacted with 45% to 90% methylol diacetone acrylamide or methylol acrylamide copolymer. Preferred proportions for the systems referred to above can be set forth as follows although it will be appreciated that these are only given for purposes of illustration:

| System | Component (1) | Component (2) |
|---|---|---|
| (A) | Acrylic-phenolic, 15–35% | Methylol acrylamide,[1] 65–85%. |
| (B) | Epoxidized oil phenolic, 12–27%. | Methylol acrylamide,[1] 73–88%. |
| (C) | Epon phenolic, 12–32% | Methylol acrylamide,[1] 68–88%. |

[1] Or methylol diacetone acrylamide copolymers.

The coating compositions of the invention may be prepared by blending components (1) and (2) together, with or without added vehicle (e.g. naphtha) to give the desired viscosity or spreadability. The resulting component may be applied by any conventional application method such as spraying, brushing, roll coating and the like. The compositions are usually employed as coatings on metals such as steel, aluminum, etc. but may also be applied to other substrates such as wood, glass, plastics, etc.

After application to the desired substrate the compositions are cured by baking at elevated temperatures to cross-link the components and thus give a tough flexible film. The baking conditions selected will depend upon the nature of the particular composition, the substrate involved, and the manner in which it is to be used. However generally, baking temperatures of at least 300° F. and up to 550° F. are employed for periods of from about 20 minutes down to 30 seconds.

The novel compositions of this invention may be pigmented to provide colored finishes upon curing. Other components found in coating compositions such as driers, fillers, stabilizers, may also be added to the compositions as desired.

The following examples are given for purposes of illustration but without intending to limit the invention, parts being on a weight basis unless otherwise specified:

EXAMPLE 1

The following is an example of the preparation of a polyphenolic precursor, hereinafter referred to as Solution A. In this example, a commercially available ethoxyline resin composition was employed, known as "Epon 828" sold by the Shell Chemical Corporation and prepared from Bisphenol A and epichlorohydrin.

| Solution A: | Parts by weight |
|---|---|
| Cellosolve acetate | 399 |
| N,N-dimethyl benzyl amine | 1 |
| Epon 828 | 279 |
| Bisphenol A | 321 |

The mixture was heated to reflux temperature of 170° C. and held for one hour. At the end of this period, the epoxy functionality of the Epon 828 had reacted to produce a phenolic terminated polymer precursor.

EXAMPLE 2

A phenolic precursor was prepared from the following reactants, herein referred to as Solution B.

| Solution B: | Parts by weight |
|---|---|
| Epoxidized oil (Epoxy equivalent 400) | 1983.6 |
| Bisphenol A (1 mole per epoxy equivalent) | 948.0 |
| Benzyl trimethyl ammonium hydroxide (40% in methanol) | 68.4 |

These materials were mixed and heated under straight reflux to 180° C. and held for two hours. At the end of this period the reaction was cooled, reduced to 65 parts nonvolatiles in a mixture of 80 parts butyl Cellosolve, 20 parts toluene. The viscosity was Y on the Gardner scale.

EXAMPLE 3

A phenolic precursor was prepared as in Example 2, utilizing 2 mols of Bisphenol A for each epoxy equivalent.

| | Parts by weight |
|---|---|
| Epoxidized oil (epoxy equivalent 400) | 478 |
| Bisphenol A (2 mols per epoxy equivalent) | 456 |
| Benzyl trimethyl ammonium hydroxide (40% in methanol) | 22.9 |

EXAMPLE 4

In this example an acrylic resin containing methylol groups was prepared from the following components:

| | Parts by weight |
|---|---|
| Butanol | 20 |
| Methyl isobutyl ketone | 25 |
| Methyl methacrylate | 7.6 |
| Styrene | 11.6 |
| Butyl acrylate | 18.8 |
| Tertiary butyl perbenzoate | 2.0 |
| N-methylol acrylamide (60% in water) | 15.0 |

The butanol and methyl isobutyl ketone were placed in a flask equipped for azeotropic distillation and heated to reflux temperature of 114° C. The monomers and catalyst were added over a four hour period with removal of water contained in the N-methylol acrylamide. The resultant acrylic polymer containing methylol acrylamide groups at 50 nonvolatiles had a viscosity of Z–2 on the Gardner scale.

EXAMPLE 5

A coating composition was prepared using the following resinous components:

| | Parts by weight |
|---|---|
| Phenolic precursor component (Solution A) of Example 1 | 15.6 |
| Acrylic polymer of Example 4 | 84.4 |

These components were mixed, applied to bonderized steel and baked for 20 minutes at 325° F. An excellent cure was obtained giving a film useful as an appliance finish.

EXAMPLE 6

A coating composition was prepared using the following resinous components:

| | Parts by weight |
|---|---|
| Phenolic precursor composition (Solution B) of Example 2 | 21.0 |
| Acrylic polymer of Example 4 | 79.0 |

The components were mixed, applied to aluminum coil stock, and baked for 50 seconds at 525° F. A tough, flexible film was formed with good chemical resistance indicating utility as aluminum coil coating.

EXAMPLE 7

| Acrylic polyphenolic precursor: | Parts by weight |
|---|---|
| Xylene | 30.24 |
| Styrene | 9.20 |
| Glycidyl methacrylate | 9.20 |
| Butyl methacrylate | 6.13 |
| 2-ethyl hexyl methacrylate | 6.13 |
| Di-t-butyl peroxide | .40 |
| Bisphenol A | 19.30 |
| II° butanol | 19.20 |
| Tetra methyl ammonium chloride | .20 |

The xylene was charged to the kettle and heated to reflux (140° C.). The monomers and catalyst were added continuously over a three hour period. Upon completion of the addition, the batch was held at reflux for three and one-half hours to insure conversion of monomer to polymer. The temperature was reduced to 115° C. and Bisphenol A, II° butanol, and tetra methyl ammonium chloride added to the kettle. Reflux temperature was regained (113° C.), and the reaction of Bisphenol A with the epoxide group on the acrylic polymer chain was carried out in three hours. The resultant acrylic-phenolic polymer had an S–T viscosity at 50% nonvolatile.

EXAMPLE 8

A coating composition was prepared based on the following resinous components:

| | Parts by weight |
|---|---|
| Acrylic phenolic precursor of Example 7 | 20.0 |
| Acrylic copolymer of Example 4 | 80.0 |

The components were mixed, applied to tin-free steel, and baked 10 minutes at 350° F. A tough, flexible, resistant film was obtained suitable for interior can coating.

EXAMPLE 9

An acrylic resin containing diacetone acrylamide methylol groups was prepared from the following materials:

| | Parts by weight |
|---|---|
| Butanol | 31.27 |
| Xylene | 16.00 |
| Styrene | 9.50 |
| Ethyl acrylate | 30.50 |
| Methyl methacrylate | 8.50 |
| Hydroxy methyl diacetone acrylamide (55% in water) | 2.73 |
| t-Butyl perbenzoate | 1.00 |
| Lauryl mercaptan | .50 |

Butanol and xylene are charged to a kettle equipped for azeotropic distillation and heated to reflux temperature of 119° C. The monomers, catalyst, and chain transfer agent are then added continuously over a four hour period accompanied by removal of water contained in hydroxy methyl diacetone acrylamide. To insure conversion of monomer to polymer, the batch was held at reflux temperature for four hours after the monomer addition was complete. The resultant acrylic copolymer at 50% nonvolatile had a viscosity of T-U on the Gardner scale.

EXAMPLE 10

A coating composition was prepared utilizing the following resinous components:

| | Parts by weight |
|---|---|
| Phenolic precursor component (Solution A) of Example 1 | 5.0 |
| Acrylic copolymer of Example 9 | 95.0 |

These components were mixed, applied to tin free steel, and baked 10' at 360° F. The resultant cross-linked film was useful for interior can coatings.

EXAMPLE 11

A coating composition was prepared utilizing the following resinous components:

| | Parts by weight |
|---|---|
| Acrylic phenolic precursor of Example 7 | 7.5 |
| Acrylic copolymer of Example 9 | 92.5 |

These components, after mixing, were applied to aluminum coil stock and baked 50 seconds at 525° F. The resultant film cured to provide a useful aluminum coil coating.

It will be appreciated that various modifications of the invention as described herein may be made without in any way deviating from the invention as defined in the following claims.

What is claimed is:

1. A resinous coating composition comprising the reaction product of (A) from 5 to 55% by weight of a polyphenolic precursor which is free from epoxy groups and containing at least two phenolic hydroxyl groups obtained by reacting a phenol having at least two phenolic hydroxyl groups with a polyepoxide compound on the basis of up to one mole equivalent of epoxide per mole of the phenol and (B) from 45 to 95% by weight of a methylol acrylamide copolymer with another ethylenically unsaturated monomer, said copolymer containing free methylol groups to crosslink with said precursor by phenolic ring reaction.

2. A composition according to claim 1 wherein said phenol is selected from the group consisting of mononuclear phenols, polynuclear phenols and polyphenol resins.

3. A composition according to claim 2 wherein said polynuclear phenol is 2,2-bis(4-hydroxyphenyl)propane.

4. A composition according to claim 2 wherein said mononuclear phenol is resorcinol.

5. A composition according to claim 1 wherein the polyepoxide compound is selected from the group consisting of acrylics containing oxirane rings, epoxidized fatty acid esters, epoxidized polyolefins, ethoxyline resins, epoxidized polyphenols, and 1,2-epoxy containing polyethers of polyhydric alcohols.

6. A composition according to claim 5 wherein said ethoxyline resin has the general formula

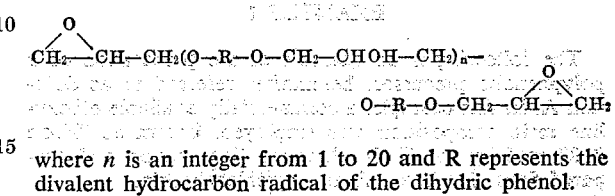

where $n$ is an integer from 1 to 20 and R represents the divalent hydrocarbon radical of the dihydric phenol.

7. A composition according to claim 1 wherein said acrylic copolymer comprises a mixture of ethylenically unsaturated monomers selected from the group consisting of acrylic or methyacrylic acids and their esters or nitriles, vinyl halides, styrene, vinyl toluene, maleic acids and esters, vinyl ethers and vinyl acetones.

8. A composition according to claim 7 wherein said acrylic copolymer comprises the copolymerization product of N-methylol acrylamide, butyl acrylate, styrene, and methyl methacrylate.

9. A composition according to claim 1 wherein the acrylic copolymer containing methylol acrylamide is partially butylated.

10. A composition according to claim 1 wherein the phenol is bisphenol A, the polyepoxide is the reaction product of polyhydric phenol with epichlorohydrin and the acrylic copolymer is the copolymerization product of N-methylol acrylamide, butyl acrylate, styrene and methyl methacrylate.

11. A composition according to claim 1 wherein the acrylic copolymer comprises methylol diacetone acrylamide.

References Cited

UNITED STATES PATENTS

| 2,870,117 | 1/1959 | Vogel | 260—834 |
| 3,242,111 | 3/1966 | Michelotti | 260—834 |
| 3,264,370 | 8/1966 | Ott | 260—834 |
| 3,399,153 | 8/1968 | Sekmakas | 260—834 |
| 3,510,540 | 5/1970 | Kapalko | 260—834 |
| 3,510,541 | 5/1970 | Kapalko | 260—834 |

FOREIGN PATENTS

| 881,498 | 11/1961 | Great Britain | 260—834 |

PAUL LIEBERMAN, Primary Examiner

U.S. Cl. X.R.

260—18 Ep, 19 Ep, 21, 47 Ep, 831, 844